UNITED STATES PATENT OFFICE.

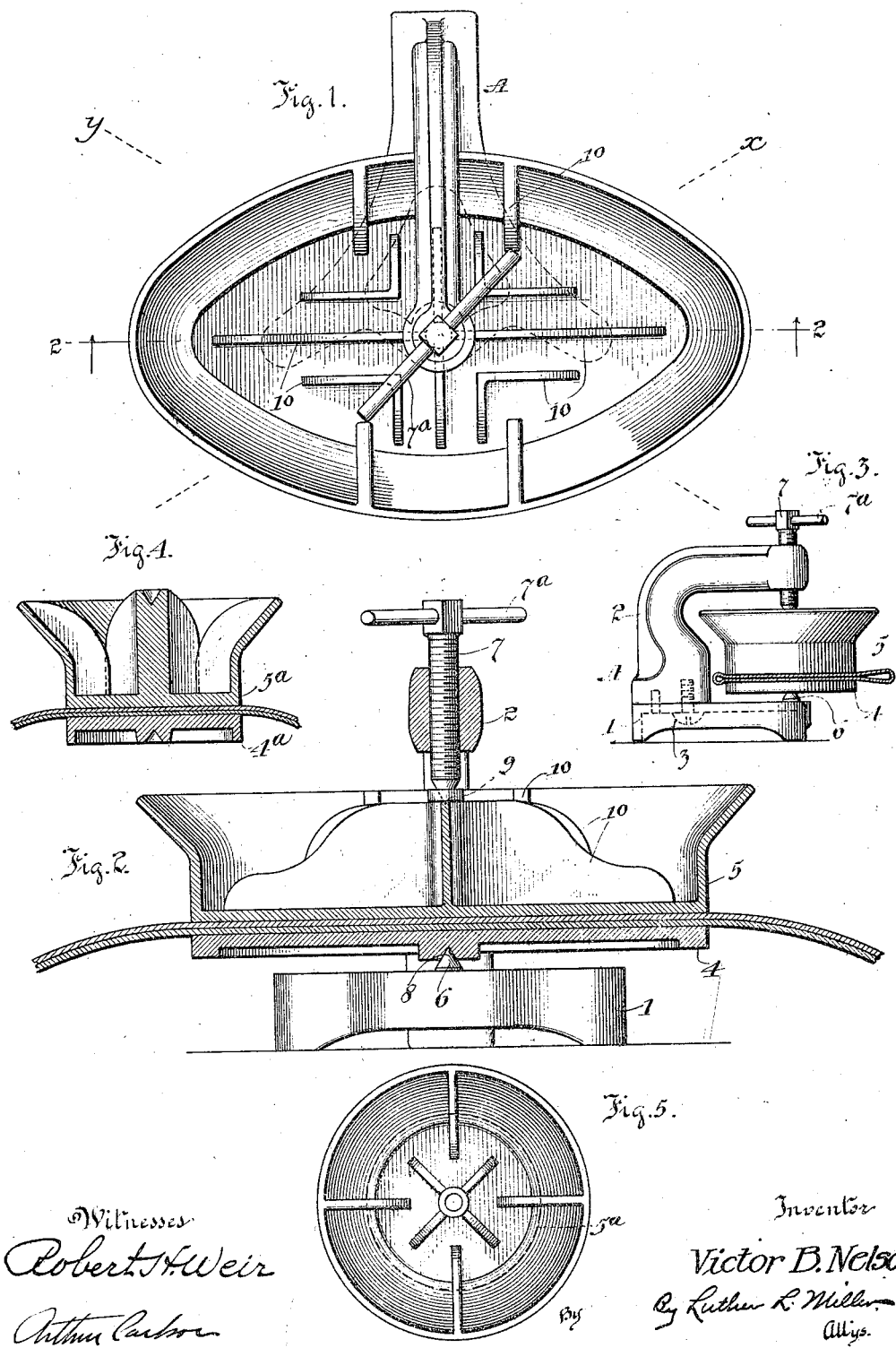

VICTOR B. NELSON, OF ROCKFORD, ILLINOIS, ASSIGNOR TO NATIONAL LOCK COMPANY, OF ROCKFORD, ILLINOIS, A CORPORATION OF ILLINOIS.

VULCANIZER.

1,200,009. Specification of Letters Patent. Patented Oct. 3, 1916.

Application filed February 19, 1913. Serial No. 749,354.

*To all whom it may concern:*

Be it known that I, VICTOR B. NELSON, a citizen of the United States, residing at Rockford, in the county of Winnebago and State of Illinois, have invented certain new and useful Improvements in Vulcanizers, of which the following is a specification.

This invention relates to apparatus for vulcanizing the material used in repairing the inner tubes of pneumatic tires and other articles.

Among the salient objects of the invention are to provide for uniform pressure upon the parts to be united, notwithstanding differences in the thickness of the parts at different points to confine the heat as much as possible to the parts requiring heat; to produce a clamping device which shall be adjustable to right or left into position to correspond with the direction of the cut or tear to be repaired; to provide simple means for clamping and releasing the tube or other article, so that it shall not be necessary to hold or handle the heated parts; and to provide the heat-generating portion with a bell-mouth to facilitate the access of air to the flame and thus cause the combustion to occur relatively close to the parts to be heated.

In the accompanying drawings, Figure 1 is a top plan view of a vulcanizer embodying the features of my invention. Fig. 2 is a vertical central section taken in the plane of dotted line 2—2 of Fig. 1, showing the apparatus in use. Fig. 3 is a side elevation on a reduced scale. Figs. 4 and 5 are sectional and top plan views, respectively, of elements adapted to be employed in connection with the frame shown in Fig. 3, when a comparatively small area is to be repaired.

The means by which pressure and heat are applied to the parts to be united comprises a frame or holder A consisting of a base 1 and an upwardly extending bracket 2, said base and bracket being secured together by any suitable means, such as a screw 3. It will be seen that the holder has an open side or throatway.

The tube and the repairing material are confined between two clamp members of any suitable size and shape. I may provide upper and lower clamp members 4 and 5 of elliptical form for use in repairing comparatively large cuts and tears, and clamp members 4ª and 5ª of circular form and smaller in size than the members 4 and 5, for punctures and small cuts. In order to apply pressure to the clamp members, and prevent heat from being readily conducted from the clamp members to the base 1 or the bracket 2, I mount the clamp members between a pointed stud 6 on the base and a clamping screw 7 carried by the bracket, the member 4 having upon its lower side a socket 8 to receive the stud 6, and the member 5 having upon its upper side a recess 9 for the reception of the lower end of the screw 7. The screw 7 has a handle or cross bar 7ª. The stud 6 and the screw 7 are vertically alined, and constitute a pivotal support for the clamp members, whereby the latter may be turned with relation to the frame or holder A into the most convenient and effective position. Thus the clamp members may be swung with relation to the holder into the positions indicated by the dotted lines $x$ $y$, so as to extend lengthwise of a tear or cut that extends at an angle to the axis of the tube. The upper clamp member 5 is of such construction as to serve as a receptacle for a suitable fuel, such as gasolene. In order that the heat of the combustion may be quickly conducted to the lower surface of the member 5, said member is provided with interior webs or ribs 10. The lower clamp member 4 is preferably of light construction so as to absorb as little heat as possible from the parts to be heated. The clamp members 4ª, 5ª are substantially similar in construction to the members 4 and 5, save that the former are circular and smaller.

In practice, the material used in closing or patching a cut, puncture or tear is put in position on the tube, and the clamp members 4 and 5 (or 4ª 5ª) are placed at opposite sides of the tube, the upper clamp member being in contact with the repair material. The clamp members are then placed in the holder A, and secured therein by means of the screw 7. A suitable quantity of gasolene or other fuel is placed in the upper clamp member and ignited. The heat of the combustion is conducted by the ribs or webs 10 to the lower face of the upper clamp member, and thus to the repair material, thereby vulcanizing the latter and causing it to become an integral part of the tube. When sufficient time for the vulcanizing operation has passed, the tube is released by loosening the screw 7 and giving the holder A a jerk, or tipping the holder forward, the clamp members and the tube being thereby caused to fall out of the holder. It will be seen that the screw 7 can be loosened by striking the cross-bar thereof with a tool, and that, in removing the tube from the vulcanizer, it is unnecessary to hold, touch or handle the heated parts. By making the clamp members separable from the holder or frame by which they are pressed together, it is possible to use interchangeable clamp members of sizes and shapes to conform to the areas to be repaired, thus permitting localization of the heat. The clamp members being subjected to pressure at two central, directly opposite points, said members are free to adjust themselves to any inequalities in the thickness of the rubber and thus exert even pressure upon the parts. The frame or holder having an open side or throatway, it is capable of receiving relatively large objects.

I claim as my invention:

In a vulcanizer, in combination, upper and lower clamp members, the former being cupped to form a fuel receptacle, and a holder for said clamp members, said holder having a lower arm provided with a projecting pivot engaging under the bottom of the lower member, and having an upper arm provided with a clamping device engaging the top of the upper member opposite said pivot.

In testimony whereof, I affix my signature in the presence of two witnesses.

VICTOR B. NELSON.

Witnesses:
  E. C. TRANER,
  HAROLD C. WOLFE.